United States Patent [19]

Sugama et al.

[11] Patent Number: 5,763,738
[45] Date of Patent: Jun. 9, 1998

[54] CHEMICAL AGENTS FOR CONVERSION OF CHRYSOTILE ASBESTOS INTO NON-HAZARDOUS MATERIALS

[75] Inventors: Toshifumi Sugama, Wading River; Leon Petrakis, Port Jefferson, both of N.Y.

[73] Assignee: Associated Universities, Inc., Washington, D.C.

[21] Appl. No.: 722,803

[22] Filed: Sep. 27, 1996

[51] Int. Cl.[6] .................. A62D 3/00; B09B 3/00
[52] U.S. Cl. .................. 588/236; 588/242; 588/901; 423/659; 523/132; 524/401; 524/404; 524/415; 524/421
[58] Field of Search .................. 524/404, 421; 523/132; 588/236, 242; 423/659

[56] References Cited

U.S. PATENT DOCUMENTS

| | | | |
|---|---|---|---|
| 3,721,637 | 3/1973 | Schultz | 260/29.6 |
| 3,821,063 | 6/1974 | D'Olier | 161/60 |
| 4,818,143 | 4/1989 | Chou | 405/128 |
| 5,041,277 | 8/1991 | Mirick | 423/659 |
| 5,258,562 | 11/1993 | Mirick et al. | 588/242 |
| 5,264,655 | 11/1993 | Mirick et al. | 588/242 |
| 5,317,056 | 5/1994 | Batdorf | 524/556 |

FOREIGN PATENT DOCUMENTS

975-738-A  12/1980  U.S.S.R.

*Primary Examiner*—Tae Yoon
*Attorney, Agent, or Firm*—Margaret C. Bogosian

[57] ABSTRACT

A composition and methods for converting a chrysotile asbestos-containing material to a non-regulated environmentally benign solid which comprises a fluoro acid decomposing agent capable of dissociating the chrysotile asbestos to non-regulated components, wherein non-regulated components are non-reactive with the environment, and a binding agent which binds the non-regulated components to form an environmentally benign solid.

24 Claims, 2 Drawing Sheets

FIGURE 1

ASBESTOS

SILICA GEL

SELLAITE

CSB BINDER            HALF-SALT COMPLEXES Mg-COMPLEXED CSB POLYMERS

FIGURE 2

CHEMICAL AGENTS FOR CONVERSION OF CHRYSOTILE ASBESTOS INTO NON-HAZARDOUS MATERIALS

This invention was made with Government support under contract number DE-AC02-76CH00016, awarded by the U.S. Department of Energy. The Government has certain rights in the invention.

The present invention relates to a composition and methods for converting a chrysotile asbestos-containing material to a non-regulated environmentally benign solid.

BACKGROUND OF THE INVENTION

Chrysotile asbestos is a silicate mineral characterized by a long fiber that is serpentine in shape. Chrysotile asbestos has been widely used from the 1940's through the early 1970's for fire resistance, moisture control, and thermal insulation in buildings, ranging from residential homes to industrial complexes. Examples of chrysotile asbestos-containing materials are friable thermal insulations, asbestos-cement pipes, asbestos-cement sheets, floor and roof shingles, transit tiles, acoustical plaster, fire-retardant paper products, and high-temperature insulation.

Government agencies have banned the use of certain products containing chrysotile asbestos in building construction. There still remains, however, the continuing presence of chrysotile asbestos-containing materials in many existing buildings as well as the disposition of chrysolite asbestos-containing materials which were removed from buildings.

Many building owners have chosen to employ additional measures to ensure that asbestos fibers do not enter occupied space. A temporary and inexpensive method is spraying a surface-coating encapsulating material onto the chrysotile asbestos-containing materials to lock-in asbestos. This method, however, provides only a temporary remedy.

Another method employed by building owners is to completely remove all chrysotile asbestos-containing materials. However, this method involves a significant amount of time and expense because it requires the buildings to be sealed off, all chrysotile asbestos-containing materials to be debrided, and all of the debrided chrysotile asbestos-containing materials to be disposed. In addition, many safe-guards must be employed to prevent inhalation of airborne asbestos by workers and others in the vicinity of the working area. Furthermore, the disposal of the debrided chrysotile asbestos-containing materials also remains costly.

U.S. Pat. No. 5,317,056 issued to Batdorf is directed to a latex composition for wetting and encapsulating asbestos-containing materials to reduce the number of airborne asbestos fibers generated during the removal and disposal of asbestos-containing materials. The composition of Batdorf effectively reduces the number of airborne asbestos fibers during the removal and disposal of asbestos-containing materials. However, it does not convert asbestos-containing materials to benign materials, and thus does not solve the problem of existing chrysotile asbestos-containing materials in many buildings.

U.S. Pat. No. 4,818,143 issued to Chou is directed to a method for decomposing and disposing asbestos through the use of a two-part chemical process. The first step in the chemical process involves the decomposition of asbestos through the use of sulfuric acid. The second step of the process involves the solidification of the products resulting from the decomposition step. In addition, the decomposed mixture has to be neutralized before the solidification step can take place. Thus, although this method is effective, it suffers from the drawbacks of being time consuming and expensive as it requires numerous steps.

U.S. Pat. Nos. 5,041,277, 5,258,562 and 5,264,655 to Mirick and Mirick et al. are directed to method and products for converting asbestos to a non-asbestos material. The method of the 5,041,277 patent requires wetting the asbestos-containing materials with weak organic acids and subsequently rewetting the asbestos-containing materials with additional weak organic acids. This method, although effective, is not efficient in time and cost because it requires successive wetting of asbestos-containing materials.

The methods of the 5,258,562 and 5,264,655 patents require wetting asbestos-containing with an aqueous solution consisting of weak organic acid, such as trifluoroacetic acid, and optionally fluoride ions. Again, although the methods of the Mirick et al. patents may be effective, they are not efficient in cost and time because the disclosed technology requires the conversion process to be repeated as frequently as possible so that the asbestos-containing materials are subjected to successive spraying with acid solution.

It is therefore an object of the present invention to provide a composition and method for converting chrysotile asbestos-containing materials to benign materials which overcome the above difficulties generally associated with the prior art.

SUMMARY OF THE INVENTION

The present invention, which addresses the needs of the prior art, includes a composition and methods for converting a chrysotile asbestos-containinig material to a non-regulated environmentally benign solid. The composition includes (1) a fluoro acid decomposing agent capable of dissociating the chrysotile asbestos to non-regulated components, wherein the non-regulated components are non-reactive with the environment, and (2) a binding agent which binds the non-regulated components to form an environmentally benign solid.

In one preferred embodiment, the fluoro acid is present in an amount of about 5–20 wt %.

In another preferred embodiment, the composition includes a binding agent which is a water-dispersible polymeric material, preferably in an amount of about 1–10 wt %.

The present invention also relates to a method for converting a chrysotile asbestos-containing material to a non-regulated environmentally benign solid. This method includes the steps of (a) decomposing the chrysotile asbestos with a fluoro acid, preferably present in an amount of about 5–20 wt %, to non-regulated components, wherein the non-regulated components are non-reactive with the environment; and (b) binding the non-regulated components with a binding agent to form an environmentally benign solid.

In a preferred embodiment, the decomposing and binding steps are carried out simultaneously in a single step which includes wetting a chrysotile asbestos-containing material with a sufficient amount of a chemical treatment formulation to convert the chrysotile asbestos to an environmentally benign material, wherein the formulation comprises a fluoro acid decomposing agent and a binding agent.

The present invention also relates to a method for converting a chrysotile asbestos-containinig material installed on a metal substrate to a non-regulated environmentally benign solid. This method includes the steps of (a) wetting the chrysotile asbestos-containing material installed on the substrate with a sufficient amount of binding agent to bind the chrysotile asbestos, and (b) subsequently wetting the chrysotile asbestos with a sufficient amount of decomposing agent to (1) dissociate the chrysotile asbestos to non-regulated components, wherein the non-regulated components are non-reactive with the environment.

In one preferred embodiment, the binding agent is applied in an amount sufficient to prevent the metal substrate from corroding and the fluoro acid decomposing agent is present in an amount of about 5–20 wt %.

In another preferred embodiment, the binding agent is a water-dispersible polymeric material in an amount sufficient to bind the non-regulated components to form an environmentally benign solid, preferably in an amount of about 1–10 wt %.

In another embodiment of the present invention, the treatment of chrysotile asbestos is accomplished by a two step method. The first step includes wetting chrysotile asbestos installed on a metal substrate with a binding agent. The binding agent reacts into two ways: (1) binds the chrysotile asbestos; and (2) prevents corrosion of the metal substrate. The second step includes wetting chrysotile asbestos with a decomposing agent. The decomposing agent dissociates chrysotile asbestos to non-regulated components, wherein the non-regulated components are non-reactive with the environment.

The present invention converts chrysotile asbestos-containing materials to non-regulated environmentally benign solids so as to eliminate chrysotile asbestos in existing buildings, during the removal and disposal of chrysotile asbestos-containing materials in renovation or demolition of buildings.

The present invention also prevents corrosion of metal substrates on which chrysotile asbestos-containing materials are installed as well as converting the chrysotile asbestos-containing materials to non-regulated environmentally benign solids.

The resulting non-regulated environmentally benign solids produced by the instant process exhibit fireproofing properties.

For a better understanding of the present invention, together with other and further objects, reference is made to the following description taken in conjunction with the examples, the scope of which is set forth in the appended claims.

DETAILED DESCRIPTION OF THE INVENTION

The present invention is a composition and methods for converting a chrysotile asbestos-containing material to a non-regulated environmentally benign solid.

Non-regulated chrysotile asbestos refers to chrysotile asbestos which has been morphologically altered to reduce or nullify its hazardous effect on mammals.

By nature chrysotile asbestos is a serpentine silicate mineral. Each chrysotile asbestos fiber is a long hollow tube. The diameters of the individual tubes are 20 to 50 mm. The length-to-diameter ratio can vary from 20:1 to well over 10,000:1. The chemical composition of chrysotile asbestos can be represented as $Mg_3(Si_2O_5)(OH)_4$.

The crystalline structure of chrysotile asbestos consists of alternating layers of silicate, magnesium oxide, and magnesium hydroxide bound to each other through covalently shared oxygen molecules. These layers are transverse to the fiber axis and appear to form a tubular scroll-like structure. More specifically, chrysotile asbestos can be characterized as a hollow cylindrical tube with the external surface formed by the magnesium hydroxide layer, and with the internal surface formed by the silicate layer. See FIG. 1.

When the morphology of chrysotile asbestos is altered by becoming non-regulated or "unrolled" or "uncoiled" the hazardous nature of chrysotile asbestos ceases. Thus, the non-regulated chrysotile asbestos is environmentally benign.

When chrysotile asbestos is exposed to acids, leaching and lixiviation of the magnesium from the chrysotile asbestos occur as a result of the interaction between the hydroxyl groups in the magnesium hydroxide layer and the hydrogen ions liberated from the acids. Consequently, the magnesium hydroxide layer is eliminated. The exposure of the chrysotile asbestos to the acid results in the conversion of the silicate layer into its various components. More specifically, the acid breaks the Si-OH linkages of the silicate tetrahydron of chrysotile asbestos.

As a result of the above reactions, the tubular scroll-like structure of chrysotile asbestos was converted into an open and unrolled one. Hence, the chrysotile asbestos is converted to a non-regulated environmentally benign component.

The inorganic fluoro acid catalyzed decomposition of chrysotile asbestos, followed by the formation of silica gel, can be illustrated as follows:

$Mg_3Si_2O_5(OH)_4+HF \rightarrow MG^{2+}+SiO_3^{2-}+H^++OH^-+F^-nSiO_3^{2-}+2H^+ \rightarrow (SiO_2)_x xH_2O+2H_2O$.

Figure 1:
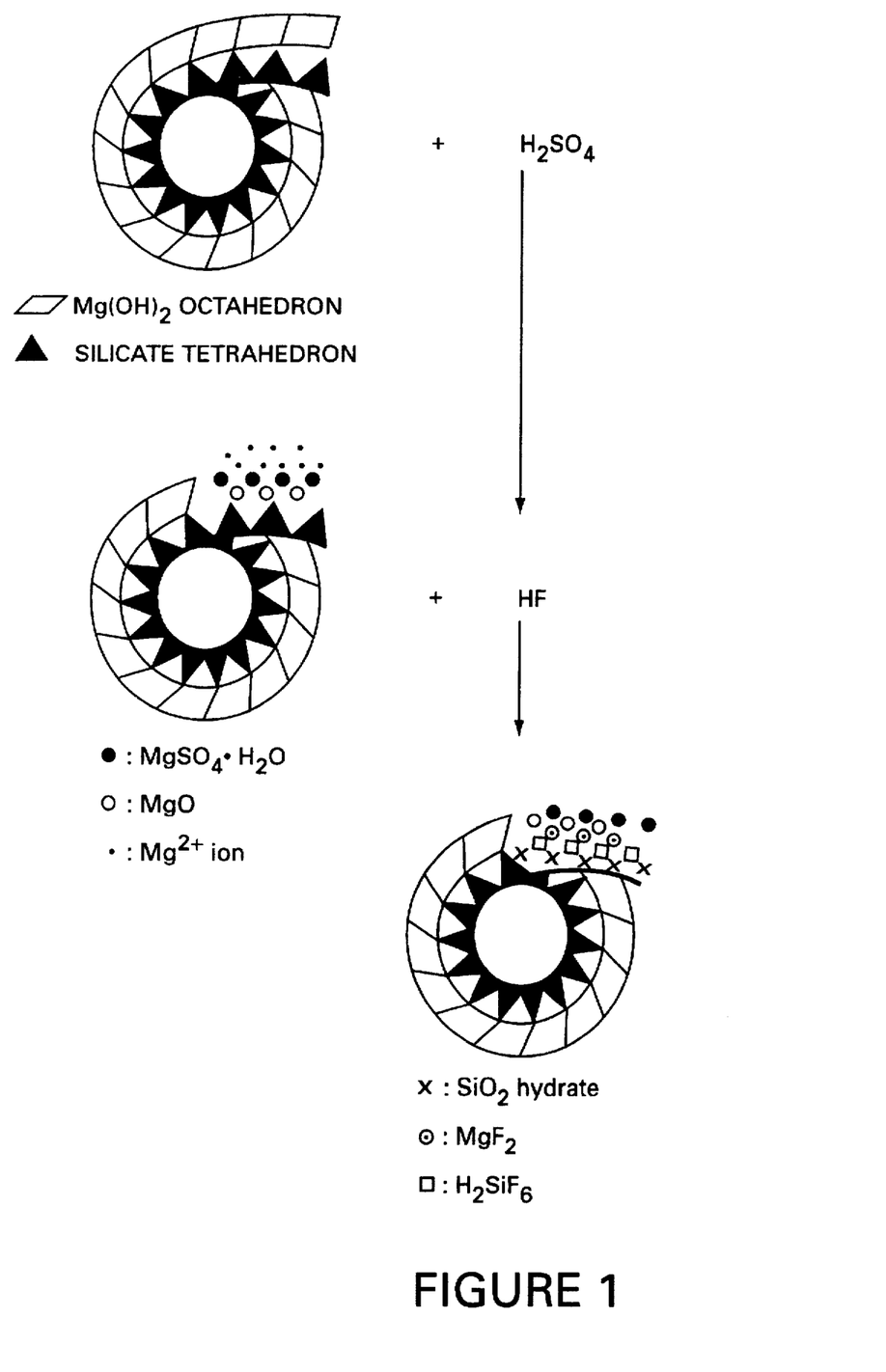
FIG. 1 illustrates the morphology of chrysotile asbestos and its decomposition when treated with fluorosulfonic acid ($FSO_3H$).

FIG. 1 illustrates the decomposition of chrysotile asbestos by treatment with fluorosulfonic acid ($FSO_3H$). As shown in FIG. 1, the morphological feature of chrysotile fibers is represented by the scroll-tubular structure assembled by rolling up the double layers consisting of $Mg(OH)_2$ octahedron layer as outer layer and silicate tetrahedron as inner layer. When the $FSO_3H$ solution comes in contact with the fiber surfaces, $H_2SO_4$ acid is derived from $FSO_3H$ and reacts with the external $Mg(OH)_2$ layer of chrysotile and not the inner silicious layer. This reaction leads to the precipitation of the crystalline $MgSO_4 \cdot H_2O$ and amorphous MgO, and the lixivation of $Mg^{2+}$ ions from the $Mg(OH)_2$ layers. Once the breakdown of the $Mg(OH)_2$ layer is initiated, the diffusion of HF derived from $FSO_3H$ reacts with the silicate layer. Concurrently the ionic reaction between the $F^-$ from HF and the lixiviated $Mg^{2+}$ served in precipitating $MgF_2$. The hydrolysis of $SiF_4$ produces $SiO_2$ hydrate as byproduct and $H_2SiF_6$ as reaction product, and thus alters the morphology of chrysotile asbestos.

Figure 2:
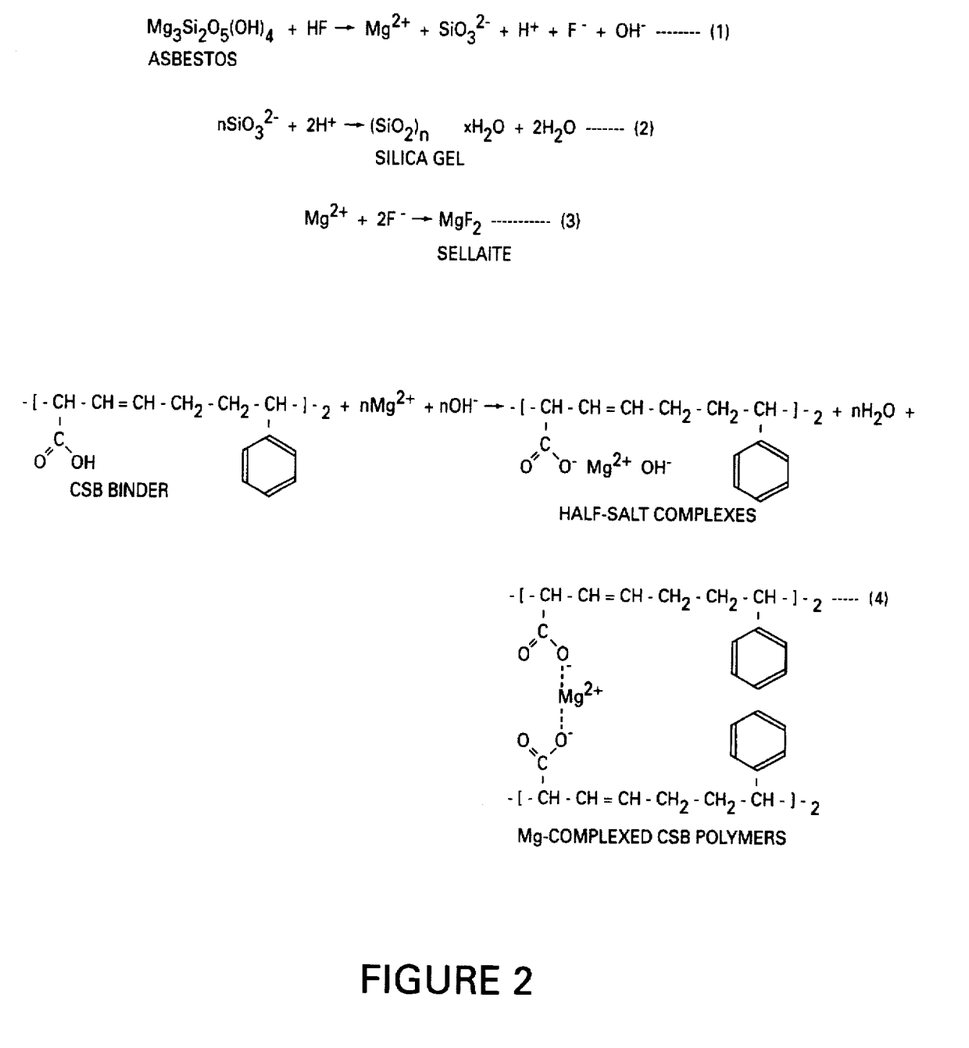
FIG. 2 illustrates the reaction mechanisms of the treatment of chrysotile asbestos with hydrofluoric acid (UF) and carboxylated styrene-butadiene (CSB).

FIG. 2 further illustrates the mechanisms of decomposing chrysotile asbestos by treating it with a chemical solution which includes carboxylated styrene-butadine (CSB) and hydrofluoric acid (HF).

The decomposing agent of the present invention is a fluoro acid in the amount of 5–20 wt %, preferably 15 wt %. Fluorine-based acids suitable for use in the present invention include $FSO_3H$, $CF_3SO_3H$, $C_2F_5SO_3H$, $C_5F_{11}SO_3H$, $C_8F_{17}SO_3H$, $FP(O)(OH)_2$, $HBF_4$, $H_2SiF_6$, $FCH_2COOH$ and $FC_6H_4COOH$. The preferred fluoro acids of the invention are fluorosulfonic acid ($FSO_3H$), fluorophosphoric acid [$FP(O)(OH)_2$], fluoboric acid (fluoroboric acid) ($HBF_4$), fluorosilicic acid ($H_2SiF_6$), fluoroacetic acid ($FCH_2CO_2H$), and fluorobenzoic acid ($FC_6H_4CO_2H$).

The binding agent is a water-dispersible polymeric material, preferably, in the amount of 1–10 wt %, and more preferably 5 wt %. Examples of the polymeric material of the present invention are carboxylated styrene-butadiene copolymer, styrene-acrylate copolymer, acrylonitrile-butadiene-styrene copolymer, ethylene-methacrylic acid copolymer, ethylene-propylene-diene copolymer, isoprene-isobutylene copolymer, vinylidene fluride compolymer, and acrylic polymer. The preferred water-dispersible polymeric materials are carboxylated styrene-butadiene (CSB) copolymer, styrene-acrylate (SA) copolymer, and acrylic (AL) polymer emulsions.

Examples have been set forth below for purpose of illustration and to describe the best mode of the invention at the present time. The scope of the invention is not to be in any way limited by the Examples set forth herein.

EXAMPLE 1

Preparation of Chrysotile Asbestos Control Sample

A 0.7 gram (g) sample of a chrysotile asbestos-containing material was placed in a plastic test tube (2.0 cm×6.0 cm). Subsequently, 10 g of a control composition (0.1 g polymer, and 9.9 g water) was then poured into the test tube. The mixture was left for a period of 2 hours at room temperature without any physical agitation. The precipitate was filtered out of the test tube and then rinsed with deionized water to remove water soluble residues.

The chrysotile asbestos precipitate was an insoluble compound which was subsequently dried in an oven at 50° C. for a period of 24 hours. The dried precipitate was then analyzed utilizing Fourier Transform-Infrared spectroscopy (FT-IR) to identify its components and to quantitate the amount of residual chrysotile asbestos contained in the analyzed sample.

EXAMPLE 2

Conversion of Chrysotile Asbestos Utilizing the Compositions of the Present Invention A 0.7 gram (g) sample of a chrysotile asbestos-containing material was placed in a plastic test tube (2.0 cm×6.0 cm). Subsequently, 10 g of a composition, which includes an acid solution, 5.0 wt % $FSO_3H$, 1.0 wt % polymer, and 94.0 wt %, water was poured into the test tube. The mixture was left for a period of 2 hours at room temperature without any physical agitation to the mixture. The precipitation of reaction products was observed. The precipitate was filtered out of the test tube and then rinsed with deionized water to remove water soluble residues.

The precipitate was an water-insoluble compound which was subsequently dried in an oven for a period of 24 hours at 50° C. The dried insoluble compound was then examined utilizing FT-IR to identify the reaction products and to quantite the amount of residual chrysotile asbestos.

EXAMPLES 3–4

Conversion of Chrysotile Asbestos Utilizing the Compositions of the Present Invention Examples 3–4 were prepared in accordance with the procedure described in Example 2 with the exception of a change in concentration of the acid solution to 10 wt % and 15 wt %, respectively.

EXAMPLES 5–7

Conversion of Chrysotile Asbestos Utilizing the Compositions of the Present Invention Examples 5–7 were prepared in accordance with the procedure described in Example 2 with the exception of the substitution of 5.0 wt % $FSO_3H$ with $FP(O)(OH)_2$ at a concentration of 5.0 wt %, 10.0 wt % and 15.0 wt %, respectively.

EXAMPLES 8–10

Conversion of Chrysotile Asbestos Utilizing the Compositions of the Present Invention Examples 8–10 were prepared in accordance with the procedure described in Example 2 with the exception of the substitution of 5.0 wt % $FSO_3H$ with $HBF_4$ at a concentration 5.0 wt %, 10.0 wt % and 15.0 wt %, respectively.

EXAMPLES 11–14

Conversion of Chrysotile Asbestos Utilizing Conventional Compositions

Examples 11–14 were prepared in accordance with the procedure described in Example 2 with the exception of the substitution of 5.0 wt % $FSO_3H$ with 10.0 wt % oxalic acid, (15.0 wt % $(NH_4)HF_2$, 18.8 wt % acid (6.3 wt % oxalic acid in combination with 12.5 wt % $(NH_4)HF_2$), and 50.6 wt % acid (49.4 wt % $(NH_4)HSO_4$, in combination with 1.2 wt % $(NH_4)HF_2$), respectively.

FT-IR ANALYSIS OF SAMPLES FROM EXAMPLES 1–14

A Perkin-Elmer 1600 Series FT-IR spectrophotometer was used to identify the decomposition products of the chrysotile asbestos treated in Examples 1–14. FT-TR samples from the dried precipitates of Examples 1–14 were prepared in the following manner.

3.5 mg samples of the dried precipitates from Examples 1–14 were mixed with 200 mg of IR-grade Potassium Bromide (KBr). The components were sufficiently ground to obtain a homogeneous mixture for optimum particle size. Each mixture was then pressed in a die at a pressure of 7-tons to obtain a transparent, homogeneous pellet which was about 1.3 cm in diameter and about 0.1 cm thick. Each of the samples was then measured for an absorbance value at the IR frequency of 3690 $cm^{-1}$.

The IR absorbance value at 3690 $cm^{-1}$ represents the existence of the Si—OH linkages found in the silicate tetrahedron of chrysotile asbestos. The magnitude of the absorbance value at 3690 $cm^{-1}$ is indicative of the amount of the Si—OH groups in the sample. For example, a high absorbance value at 3690 $cm^{-1}$ indicates a large number of intact Si—OH linkages in the sample. Similarly, a low absorbance value at 3690 $cm^{-1}$ indicates a small number of intact the Si—OH linkages in the sample.

The reduction in the number of the Si—OH linkages indicates that the morphology of the chrysotile asbestos is being altered, thereby converting the chrysotile asbestos to a non-regulated environmentally benign component. Thus, a low absorbance value at 3690 $cm^{-1}$ represents a fast converting rate of chrysotile asbestos and a high absorbance value represents a slow converting rate of chrysotile asbestos.

The IR absorbance values at 3690 cm$^{-1}$ of the pellets prepared from the dried precipitates in Examples 1–14 are shown in Table 1.

TABLE 1

| Ex. | Chemical reagent | IR absorbance, $\Delta A$, of Si—OH group at 3690 cm$^{-1}$ | $\Delta A_t*/\Delta A_0** \times 100, \%$ |
|---|---|---|---|
| 1 | Asbestos | 1.11 | 100.0 |
| 2 | 5.0 wt % FSO$_3$H | 0.42 | 37.8 |
| 3 | 10.0 wt % FSO$_3$H | 0.06 | 5.4 |
| 4 | 15.0 wt % FSO$_3$H | 0.01 | 0.9 |
| 5 | 5.0 wt % FP(O)(OH)$_2$ | 0.50 | 45.1 |
| 6 | 10.0 wt % FP(O)(OH)$_2$ | 0.14 | 12.6 |
| 7 | 15.0 wt % FP(O)(OH)$_2$ | 0.08 | 7.2 |
| 8 | 5.0 wt % HBF$_4$ | 0.71 | 64.0 |
| 9 | 10.0 wt % HBF$_4$ | 0.21 | 18.9 |
| 10 | 15.0 wt % HBF$_4$ | 0.11 | 9.9 |
| 11 | 10.0 wt % oxalic acid | 0.64 | 57.7 |
| 12 | 15.0 wt % (NH$_4$)HF$_2$ | 0.80 | 72.1 |
| 13 | 18.8 wt % acid (6.3 wt % oxalic acid- 12.5 wt % (NH$_4$)HF$_2$) | 0.19 | 17.1 |
| 14 | 50.6 wt % acid (49.4 wt % (NH$_4$)HSO$_4$- 1.2 wt % (NH$_4$)HF$_2$) | 0.15 | 13.5 |

*$\Delta A_t$: absorbance value of chemically treated asbestos
**$\Delta A_0$: absorbance value of untreated asbestos The efficiency of chrysotile asbestos conversion utilizing various compositions was determined by comparing the various absorbance values at IR frequency of 3690 cm$^{-1}$. The resulting data in Table 1 demonstrate that the composition of the present invention utilized in Examples 2–10 yields a lower rate of absorbance (i.e., a greater rate of chrysotile asbestos conversion) than the conventional compositions utilized in Comparative Examples 11–14.

The control sample of Example 1 illustrates that when chrysotile asbestos was not treated with an acid, the IR absorbance is 1.11. In Example 11, when chrysotile asbestos was treated with 10 wt % of a conventional acid the IR absorbance value reduces to 0.64. However, in Examples 3,6, and 9, when chrysotile asbestos was treated with 10 wt % of the acids of the present invention, the IR absorbance value was reduced even more to 0.06, 0.14, and 0.21, respectively.

In Example 12, when chrysotile asbestos was treated with a solution containing 15 wt % of conventional acid, the IR absorbance value was reduced to 0.80. However, when chrysotile asbestos was treated with 15 wt % of the acid of the present invention in Examples 4, 7, and 10, the IR absorbance value was reduced even greater to 0.01, 0.14, and 0.11, respectively.

In Examples 13 and 14, when chrysotile asbestos was treated with increased concentration of the conventional acids, 18.8 wt % acid and 50.6 wt % acid, the IR absorbance value was reduced to 0.19 and 0.15. However, the IR absorbance values of Examples 13 and 14 were higher than the IR absorbance values of Examples 4, 7, and 10. Thus, Table 1 demonstrates that when chrysotile asbestos was treated with the acids of the present invention, lower IR absorbance values were achieved at lower concentration of acids.

Table 1 illustrates that a lower concentration of the composition of the present invention in Examples 1–10 yields a much lower absorbance value than the conventional compositions in Examples 11–14. Thus, a greater conversion rate of chrysotile asbestos was achieved when the composition of the present invention were utilized.

The following examples are presented to demonstrate superior rates of conversion of chrysotile asbestos to non-regulated materials through the utilization of the composition of the present invention.

EXAMPLES 15–18

Conversion of Chrysotile Asbestos at Different Time Intervals Utilizing Compositions of the Present Invention Examples 15–18 were prepared in accordance with the procedure described in Example 2 with the following two (2) exceptions:

(1) the substitution of 5.0 wt % FSO$_3$H with 15.0 wt % FSO$_3$H, 15.0 wt % FP(O)(OH)$_2$, 15.0 wt % HBF$_4$, and 15.0 wt % H$_2$SiF$_6$ respectively; and (2) the resulting reaction mixtures of Examples 15–18 were analyzed at the following time intervals: 0.5 hr., 2 hr., 5 hr., 10 hr., 24 hr., and 48 hr.

EXAMPLES 19–21

Conversion of Chrysotile Asbestos at Different Time Intervals Utilizing Conventional Compositions Examples 19–21 were prepared in accordance with the procedure described in Example 2 with the exception of the substitution of 5.0 wt % FSO$_3$H with 15.0 wt % (NH$_4$)HF$_2$, 18.8 wt % acid (6.3 wt % oxalic acid and 12.5 wt % (NH$_4$)HF$_2$), and 50.6 wt % acid (49.4 wt % (NH$_4$)HSO$_4$ and 1.2 wt % (NH$_4$)HF$_2$), respectively.

FT-IR ANALYSIS OF SAMPLES FROM EXAMPLES 15–21

1.0 g precipitates of Examples 15–21 were individually crushed to a size of <0.074 mm for FT-IR analysis. FT-IR samples from the products of Examples 19–21 were prepared in accordance with the procedure described in the FT-IR analysis of samples of Examples 1–14.

The results of FT-IR analysis of the samples from the precipitates of Examples 15–21 are shown in Table 2 below.

TABLE 2

| | | IR absorbance value of Si—OH group at 3690 cm$^{-1}$ | | | | | | |
|---|---|---|---|---|---|---|---|---|
| Example | Regent | 0.5 hr | 2 hr | 3 hr | 5 hr | 10 hr | 24 hr | 48 hr |
| 15 | 15 wt % FSO$_3$H | 0.12 | 0.01 | 0.00 | 0.00 | 0.00 | 0.00 | 0.00 |
| 16 | 15 wt % FP(O)(OH)$_2$ | 0.30 | 0.08 | 0.01 | 0.00 | 0.00 | 0.00 | 0.00 |
| 17 | 15 wt % HBF$_4$ | 0.46 | 0.11 | 0.05 | 0.02 | 0.00 | 0.00 | 0.00 |
| 18 | 15 wt % H$_2$SiF$_6$ | 0.62 | 0.18 | 0.11 | 0.07 | 0.03 | 0.00 | 0.00 |
| 19 | 15 wt % (NH$_4$)HF$_2$ | — | 0.80 | — | — | 0.64 | 0.31 | 0.18 |

TABLE 2-continued

| | | IR absorbance value of Si—OH group at 3690 cm$^{-1}$ | | | | | | |
|---|---|---|---|---|---|---|---|---|
| Example | Regent | 0.5 hr | 2 hr | 3 hr | 5 hr | 10 hr | 24 hr | 48 hr |
| 20 | 18.8 wt % acid (6.3 wt % oxalic acid and 12.5 wt % (NH$_4$)HF$_2$) | — | 0.19 | — | 0.03 | 0.01 | 0.00 | 0.00 |
| 21 | 50.6 wt % acid (49.4 wt % (NH$_4$)HSO$_4$ 1.2 wt % (NH$_4$)HF$_2$) | — | 0.15 | 0.07 | 0.04 | 0.01 | 0.00 | 0.00 |

The rate of conversion of chrysotile asbestos was determined by comparing the absorbance values at the IR frequency of 3690 cm$^{-1}$ at the various time intervals previously described. The resulting data in Table 2 clearly demonstrates that the compositions of the present invention yield a higher rate of chrysotile asbestos conversion. More specifically, in Example 15, when a solution containing 15 wt % FSO$_3$H was utilized, the IR value of 3690 cm$^{-1}$ was zero after 3 hours of treatment. Similarly, in Examples 16, 17, and 18, when a solution containing 15 wt % of the acids of the present invention were utilized, the IR value of 3690 cm$^{-1}$ was zero after 5 hours, 10 hours, and 24 hours of treatment, respectively.

In contrast, in Example 19, when a solution containing 15 wt % of a conventional acid was utilized, the IR value of 0.18 was observed at 3690 cm$^{-1}$ after 48 hours of treatment. Examples 20 and 21 illustrates that when solutions containing higher concentrations of the conventional acids were utilized (18.8 wt % acid and 50.6 wt % acid), the IR values reached zero at 24 hours of treatment.

Table 2 clearly illustrates that the acids of the present invention converts chrysotile asbestos to non-regulated chrysotile asbestos at a faster rate and lower concentration when compared with the conventional acids.

The above Examples demonstrate the effectiveness of various chemical compositions of the present invention in promoting the conversion rate of chrysotile asbestos. However, since chrysotile asbestos is commonly used together with gypsum and vermiculite in building construction materials, the following Examples are presented to illustrate the effect of the various chemical compositions on the rate of conversion of asbestos in the presence of gypsum and vermiculite.

EXAMPLE 22

Preparation of Control Sample of Untreated Chrysotile Asbestos in the Presence of Gypsum 4.0 wt % chrysotile asbestos, 18.6 wt % gypsum, 8.7 wt % vermiculite and 68.7 wt % water were mixed together to yield a chrysotile asbestos-containing material. The resulting chrysotile asbestos-containing material was left in an atmospheric environment to completely hydrate the gypsum.

EXAMPLE 23

Conversion of Chrysotile Asbestos-Containing Materials Utilizing the Compositions of the Present Invention Example 23 was prepared in accordance with the procedure of Example 22. The resulting product was a solid composite.

The solid composite was then immersed for 5 hrs in a solution of 15 wt % FSO$_3$H, 1 wt % polymer binding material, and 84 wt % water at 25° C. Subsequently, the composite was dried for 24 hours at 50° C.

EXAMPLE 24

Conversion of Chrysotile Asbestos-Containinig Materials Utilizing the Compositions of the Present Invention Example 24 was prepared in accordance with the procedure of Example 23 with the exception of the substitution of 15.0 wt % of FSO$_3$H with 15.0 wt % (NH$_4$)HF$_2$.

EXAMPLES 25–26

Conversion of Chrysotile Asbestos-Containing Materials Utilizing Conventional Compositions Examples 25–26 were prepared in accordance with the procedure of Example 23 with the exception of the substitution of 15.0 wt % FSO$_3$H with 15.0 wt % of (NH$_4$)HF$_2$ and 18.8 wt % acid (6.3 wt % oxalic acid in combination with 12.5 wt % (NH$_4$)HF$_2$).

FT-IR ANALYSIS OF SAMPLES FROM EXAMPLES 22–26

A 2 g sample of the resulting products of Examples 22–26 were individually crushed to a size of <0.074 mm for FT-IR analysis. FT-IR samples from the products of Examples 22–26 were prepared in accordance with the procedure described in the FT-IR analysis of Examples 1–14.

The results of the FT-IR analysis for Examples 22–26 are shown in Table 3.

TABLE 3

| Ex. | Chemical reagent | IR absorbance, $\Delta A$, of Si—OH group at 3690 cm$^{-1}$ | $\Delta A_t^*/\Delta A_o^{**} \times 100$, % |
|---|---|---|---|
| 22 | Untreated composite | 0.64 | 100.0 |
| 23 | 15 wt % FSO$_3$H | 0.02 | 3.1 |
| 24 | 15 wt % FP(O)(OH)$_2$ | 0.08 | 12.5 |
| 25 | 15 wt % (NH$_4$)HF$_2$ | 0.49 | 76.6 |
| 26 | 18.8 wt % acid (6.3 wt % oxalic acid and 12.5 wt % (NH$_4$)HF$_2$) | 0.21 | 32.8 |

*$\Delta A_t$: absorbance value of chemically treated composite
**$\Delta A_o$: absorbance value of untreated composite As demonstrated in Table 3, the control sample of Example 22 shows that when a construction material containing both chrysotile asbestos gypsum and vermiculite was not treated with a chemical reagent, the TR absorbance value was 0.64. When the same construction material was treated with 15 wt % $FSO_3H$ or 15 wt % $FP(O)(OH)_2$ solution for 5 hours in Examples 23 and 24, the IR absorbance values were reduced to 0.02 and 0.08.

In contrast, when the same material was treated with a solution containing 15 wt. % of a conventional acid for 5 hours in Example 25, the IR absorbance value was 0.49. Similarly, when the same material was treated with a solution containing a higher concentration of the conventional acid in Example 26, the IR absorbance value was 0.21.

As demonstrated in Table 3, when the conventional solutions were utilized, the absorbance rate is about 2.6 to 24.7 times higher than when the solutions of the present invention are utilized. More specifically, the treatment of a chrysotile asbestos-containing material utilizing the same or higher concentration of the conventional acids resulted in higher absorbance values than when the acid of the present invention was utilized. Thus, a faster conversion rate of chrysotile asbestos can be seen when the composition of the present invention is utilized.

The following Examples illustrate the effect of using a polymeric material to prevent corrosion when treating chrysotile asbestos-containing materials installed on metal substrates.

EXAMPLE 27

Preparation of Control Sample of Untreated Chrysotile Asbestos-Containing Material Installed on a Galvanized Steel An asbestos-containing composite consisting of 4.0 wt % asbestos, 18.6 wt % gypsum, 8.7 wt % vermiculite and 68.7 wt % water were cast in a 10 cm×5 cm disk-shaped plastic mold of galvanized substrate surfaces at 25° C. for 14 days to completely hydrate the gypsum, and to obtain a good adherence of composite to the substrates.

Subsequently, the resulting product was soaked in a 15 wt. % $FSO_3H$ solution for 5 hours. After soaking, the resulting product was left in an atmospheric environment for 7 days.

EXAMPLE 28

Treatment of Chrysotile Asbestos-Containing Material Installed on a Galvanized Steel An asbestos-containing composite consisting of 4.0 wt % asbestos, 18.6 wt % gypsum, 8.7 wt % vermiculite and 68.7 wt % water were cast in a 10 cm×5 cm disk-shaped plastic mold of galvanized substrate surfaces at 25° C. for 14 days to completely hydrate the gypsum, and to obtain a good adherence of composite to the substrates.

Subsequently, an aqueous solution containing a 5 wt % carboxylated styrene-butadiene (CSB) colloidal polymer was sprayed on the resulting asbestos-containing, composite material surfaces of the previous step, until they were completely coated by CSB polymer. The coated material was subsequently left at 25° C. for 7 days to promote the formation of a solid polymer film which binds together the asbestos, hydrated gypsum, and vermiculite to form a coherent mass, and to adhesively bind the composite phase with the metal substrate. The polymer-impregnated composite was then soaked in a 15 wt % $FSO_3H$ solution for 5 hours. After soaking, these specimens were left in an atmospheric environment for 7 days.

EXAMPLES 29–30

Treatment of Chrysotile Asbestos-Containing Material Installed on a Galvanized Steel Examples 29–30 were prepared in accordance with the procedure of Example 28 with the exception of the change in the concentration of galvanized steel to 2 wt % and 5 wt %, respectively.

EXAMPLE 31

Preparation of Control Sample of Untreated Chrysotile Asbestos-Containing Material on a Bare Steel The control sample was prepared in accordance with the procedure of Example 27 with the exception of the substitution of galvanized steel with bare steel.

EXAMPLES 32–34

Treatment of Chrysotile Asbestos-Containing Material Installed Steel

Examples 32–34 were prepared in accordance with the procedure of Example 28 with the exception of the substitution of 1 wt % galvanized steel substrate with 1 wt %, 2 wt %, and 5 wt % bare steel substrate, respectively.

CORROSION ANALYSIS OF SAMPLES OF EXAMPLES 27–34

The metal substrates of Examples 27–34 were removed from the chrysotile asbestos-containing composite and the rate of corrosion metal surface of the composite were determined. The direct current (DC) electrochemical polarization measurement was used to obtain this rate.

The metal specimen of Examples 27–34 was mounted in a holder, and then inserted into an EG & G Model K47 electrochemical cell. The polarization curves containing the cathodic and anodic region were measured at a scan rate of 0.5 $mVs^{-1}$ in the corrosion potential range of $-1.35$ to $-0.75$ V. In this test, a 0.5M NaCl solution was used as the electrolyte.

The absolute corrosion rates of metals, expressed in the conventional engineering units of milli-inches per year (MPY), was determined from the potentiodynamic polarization curve.

The corrosion rates of the specimen from each metal substrate of Examples 27–4 are illustrated in Table 4.

TABLE 4

| Ex. | Concentration of SB Polymer, wt % | Substrate | Rate of Corrosion mpy* |
|---|---|---|---|
| 27 | 0 | Galvanized steel | 19.95 |
| 28 | 1 | Galvanized steel | 9.08 |
| 29 | 2 | Galvanized steel | 8.90 |
| 30 | 5 | Galvanized steel | 8.65 |
| 31 | 0 | Bare steel | 23.88 |
| 32 | 1 | Bare steel | 12.60 |
| 33 | 2 | Bare steel | 11.02 |
| 34 | 5 | Bare steel | 10.00 |

*milli-inches per year

Table 4 illustrates the effect polymeric materials have on the metal substrate of a chrysotile asbestos. The resulting data in Table 4 clearly demonstrates that when increased concentration of polymeric material was utilized to treat chrysotile asbestos-containing material installed on a metal substrate, the rate of corrosion of the steel substrate decreased.

The following Examples demonstrate the effect of fluoric acids on chrysotile asbestos-containing materials which are installed on metal substrate and have been treated with polymeric materials.

EXAMPLE 35

Preparation of Control Sample of Untreated Chrysotile Asbestos-Containing Material on Steel Example 35 was prepared in accordance with the procedure described in Example 27 with the exception of the resulting product being soaked in a 15 wt. % $FSO_3H$ solution for the following time intervals: 2 hr., 3 hr., 5 hr., 10 hr., and 24 hr.

EXAMPLES 36–38

Treatment of Chrysotile Asbestos-containing Material Included on Steel

Examples 36–37 were prepared in accordance with the procedure of Example 28 with the following two (2) exceptions: (1) the substitution of 5 wt. % SB with 1 wt. % and 3 wt. %; and the resulting polymer impregnated composites of soaked in a 15 wt. % $FSO_3H$ solution for the following time intervals: 2 hr., 3 hr., 5 hr., 10 hr., and 24 hr.

EXAMPLE 38

Treatment of Chrysotile Asbestos-containing Material Included on Steel

Example 38 was prepared in accordance with the procedure of Example 28 with the exception of the resulting polymer-impregnated composite was soaked in a 15 wt. % $FSO_3H$ solution for the following time intervals: 2 hr., 3 hr., 5 hr., 10 hr., and 24 hr.

FT-IR ANALYSIS OF SAMPLES OF EXAMPLES 35–38

After immersing in the 15 % wt. $FSO_3H$ solution, the composite materials of Examples 35–38 were dried for 24 hrs at 50° C., and then crushed to a size of <0.074 mm for FT-IR analysis. FT-IR samples of the products of Examples 35–38 were prepared in accordance with the procedure described in the FT-IR Analysis of Samples of Examples 1–14.

Table 5 below illustrates the IR absorbance values of the reaction products of Examples 35–38.

TABLE 5

| | Concentration of SB polymer, | IR absorbance of Si—OH group at 3690 cm$^{-1}$ | | | | |
|---|---|---|---|---|---|---|
| Ex. | wt % | 2 hr | 3 hr | 5 hr | 10 hr | 24 hr |
| 35 | 0 | 0.08 | 0.04 | 0.02 | 0.00 | 0.00 |
| 36 | 1 | 0.09 | 0.05 | 0.03 | 0.00 | 0.00 |
| 37 | 3 | 0.14 | 0.08 | 0.05 | 0.02 | 0.00 |
| 38 | 5 | 0.18 | 0.10 | 0.07 | 0.04 | 0.00 |

Table 5 shows the changes in the absorbance value of Examples 35–38 at 3690 cm$^{-1}$ when different concentration of colloidal polymers are utilized at different intervals. As apparent, the rate of absorbance value depends on the concentration of SB polymer. More specifically, when the chrysotile asbestos containing material is sprayed with a solution containing a lower concentration of SB, the IR value is smaller. Similarly, when the chrysotile asbestos containing material was soaked in a solution containing 15 wt. % $FSO_3H$ for a longer period of time, the IR value decreases.

In addition, when the chrysotile asbestos containing material was treated with 15 wt. % $FSO_3H$ for 24 hours, the absorbance value is zero. Thus, when chrysotile asbestos containing material was treated with composition of the present invention for 24 hours, it converted to an environmentally benign material.

Thus, while there have been described what are presently believed to be the preferred embodiments, those skilled in the art will appreciate that other and further changes and modifications can be made without departing from the true spirit of the invention, and it is intended to include all such changes and modifications within the scope of the claims which are appended hereto.

We claim:

1. A composition for converting a chrysotile asbestos-containing material to an environmentally benign solid, comprising:
    a fluoro acid decomposing agent capable of dissociating said chrysotile asbestos to non-regulated components, wherein said non-regulated components are non-reactive with the environment; and
    a binding agent which binds said non-regulated components to form an environmentally benign solid.

2. The composition of claim 1 wherein said fluoro acid is in an amount of about 5–20 wt %.

3. The composition of claim 1 wherein said fluoro acid is a fluorine-based acid selected from the group consisting of $FSO_3H$, $HBF_4$, $H_2SiF_6$, $FP(O)(OH)_2$, $FCH_2CO_2H$, and $FC_6H_4CO_2H$.

4. The composition of claim 1 wherein said binding agent is a water-dispersible polymeric material in an amount sufficient to bind said non-regulated components to form an environmentally benign solid.

5. The composition of claim 4 wherein said water-dispersible polymeric material is in an amount of about 1–10 wt %.

6. The composition of claim 4 wherein said water-dispersible polymeric material is selected from the group consisting of carboxylated styrene-butadiene copolymer and acrylic polymer emulsions.

7. A method for converting a chrysotile asbestos-containing material to an environmentally benign solid, comprising:
    (a) decomposing said chrysotile asbestos to non-regulated components using a fluoro acid decomposing agent, wherein said non-regulated components are non-reactive with the environment, wherein said fluoro acid is a fluorine-based acid selected from the group consisting of $FSO_3H$, $CF_3SO_3H$, $C_2F_5SO_3H$, $C_5F_{11}SO_3H$, $C_8F_{17}SO_3H$, $HBF_4$, $H_2SiF_6$, $FP(O)(OH)_2$, $FCH_2CO_2H$, and $FC_6H_4CO_2H$; and
    (b) binding said non-regulated components with a binding agent to form an environmentally benign solid.

8. The method of claim 7 wherein said decomposing agent is in an amount of about 5–20 wt % fluoro acid.

9. The method of claim 7 wherein said fluoro acid is a fluorine-based acid selected from the group consisting of $FSO_3H$, $HBF_4$, $H_2SiF_6$, $FP(O)(OH)_2$, $FCH_2CO_2H$, and $FC_6H_4CO_2H$.

10. The method of claim 7 wherein said binding agent is in an amount of about 1–10 wt %.

11. The method of claim 7 wherein said binding agent is a water-dispersible polymeric material selected from the group consisting of carboxylated styrene-butadiene copolymers, styrene-acrylate copolymers, and acrylic polymer emulsions.

12. The method of claim 7 wherein step (a) and step (b) are being carried out simultaneously in a single step which comprises:

wetting a chrysotile asbestos-containing material with a sufficient amount of a chemical treatment formulation to convert said chrysotile asbestos to an environmentally benign material, wherein said formulation comprises said fluoro acid decomposing agent and said binding agent.

13. The method of claim 12 wherein said fluoro acid is in an amount of about 5–20 wt %.

14. The method of claim 12 wherein said fluoro acid is a fluorine-based acid selected from the group consisting of $FSO_3H$, $HBF_4$, $H_2SiF_6$, $FP(O)(OH)_2$, $FCH_2CO_2H$, and $FC_6H_4CO_2H$.

15. The method of claim 12 wherein said binding agent is a water-dispersible polymeric material in an amount sufficient to bind said non-regulated components to form an environmentally benign solid.

16. The method of claim 15 wherein said water-dispersible polymeric material is in an amount of about 1–10 wt %.

17. The method of claim 15 wherein said water-dispersible polymeric material is selected from the group consisting of carboxylated styrene-butadiene copolymer, and acrylic polymer emulsions.

18. A method for converting a chrysotile asbestos-containing material on a metal substrate to a non-regulated environmentally benign solid, comprising:

(a) wetting said chrysotile asbestos-containing material on said substrate with a sufficient amount of a binding agent to bind said chrysotile asbestos; and (b) subsequently wetting said chrysotile asbestos with a sufficient amount of a fluoro acid decomposing agent to dissociate said chrysotile asbestos to non-regulated components, wherein said non-regulated components are non-reactive with the environment.

19. The method of claim 18 wherein said binding agent is applied in an amount sufficient to prevent said substrate from corroding.

20. The method of claim 18 wherein said fluoro acid is in an amount of about 5–20 wt %.

21. The method of claim 18 wherein said fluoro acid is a fluorine-based acid selected from the group consisting of $FSO_3H$, $HBF_4$, $H_2SiF_6$, $FP(O)(OH)_2$, $FCH_2CO_2H$, and $FC_6H_4CO_2H$.

22. The method of claim 18 wherein said binding agent is a water-dispersible polymeric material in an amount sufficient to bind non-regulated components to form an environmentally benign solid.

23. The method of claim 22 wherein said water-dipersible polymeric material is in an amount of about 1–10 wt %.

24. A method of claim 22 wherein said water-dispersible polymeric material is selected from the group consisting of carboxylated styrene-butadiene copolymer, and acrylic polymer emulsions.

* * * * *